US 12,195,280 B2

(12) United States Patent
Cornelissen et al.

(10) Patent No.: US 12,195,280 B2
(45) Date of Patent: Jan. 14, 2025

(54) MODULAR CONVEYOR MAT AND MODULE THEREFOR

(71) Applicant: REXNORD FLATTOP EUROPE B.V., 'S-Gravenzande (NL)

(72) Inventors: Leonardus Adrianus Catharinus Cornelissen, The Hague (NL); Cornelis Hendrik Mijndert Menke, The Hague (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 99 days.

(21) Appl. No.: 17/911,525

(22) PCT Filed: Mar. 31, 2021

(86) PCT No.: PCT/NL2021/050210
§ 371 (c)(1),
(2) Date: Sep. 14, 2022

(87) PCT Pub. No.: WO2021/201682
PCT Pub. Date: Oct. 7, 2021

(65) Prior Publication Data
US 2023/0137570 A1 May 4, 2023

(30) Foreign Application Priority Data

Apr. 3, 2020 (NL) ...................... 2025273

(51) Int. Cl.
*B65G 17/40* (2006.01)
*B65G 17/08* (2006.01)
(52) U.S. Cl.
CPC ............. *B65G 17/40* (2013.01); *B65G 17/08* (2013.01); *B65G 2207/12* (2013.01); *B65G 2207/30* (2013.01)

(58) Field of Classification Search
CPC .... B65G 17/08; B65G 17/40; B65G 2207/30; B65G 2207/12
(Continued)

(56) References Cited

U.S. PATENT DOCUMENTS 3,939,964 A * 2/1976 Poerink ................. B65G 17/08
198/853
4,709,807 A * 12/1987 Poerink ................. B65G 17/08
411/509
(Continued)

FOREIGN PATENT DOCUMENTS

EP 0493349 A1 7/1992
EP 2428468 A1 3/2012
(Continued)

OTHER PUBLICATIONS

PCT International Search Report and Written Opinion, PCT/NL2021/050210, Oct. 7, 2021, 14 pages.

*Primary Examiner* — James R Bidwell
(74) *Attorney, Agent, or Firm* — Quarles & Brady LLP

(57) ABSTRACT

Module for a modular conveyor mat, comprising coupling elements at the front and rear of a body part. The coupling elements comprise a series of successive hinge parts and receiving spaces, wherein hinge parts and receiving spaces can interdigitate with receiving spaces and hinge parts of a similar module successive in convening direction, and successive modules are hingedly couplable using hinge pins extending transversely to the conveying direction, reaching through hinge bores provided in the hinge parts. The body part is provided in the middle with a dividing plane which extends parallel to the sides and along which the module is divisible into two module halves. The pairs of coupling elements located on the sides are, viewed in the direction of the main axis, implemented with a greater width than neighboring coupling elements of the body part. Further, (Continued)

pairs of coupling elements located on both sides of the dividing plane of the module are also implemented with the same width as the coupling elements with the greater width located on the sides.

16 Claims, 6 Drawing Sheets

(58) Field of Classification Search
USPC .......................................................... 198/853
See application file for complete search history.

(56) References Cited

U.S. PATENT DOCUMENTS

| | | | |
|---|---|---|---|
| 4,858,753 A * | 8/1989 | Hodlewsky | B65G 17/08 |
| | | | 198/853 |
| 5,000,312 A | 3/1991 | Damkjaer | |
| 5,024,321 A * | 6/1991 | Lapeyre | B65G 17/08 |
| | | | 198/853 |
| 5,125,504 A | 6/1992 | Corlett et al. | |
| 5,217,110 A | 6/1993 | Spangler et al. | |
| 5,335,768 A | 8/1994 | Schladweiler | |
| 2003/0170421 A1 | 9/2003 | Damkjaer | |
| 2016/0176642 A1 | 6/2016 | MacLachlan | |

FOREIGN PATENT DOCUMENTS

| | | |
|---|---|---|
| WO | 0114634 A1 | 3/2001 |
| WO | 2012074390 A1 | 6/2012 |

* cited by examiner

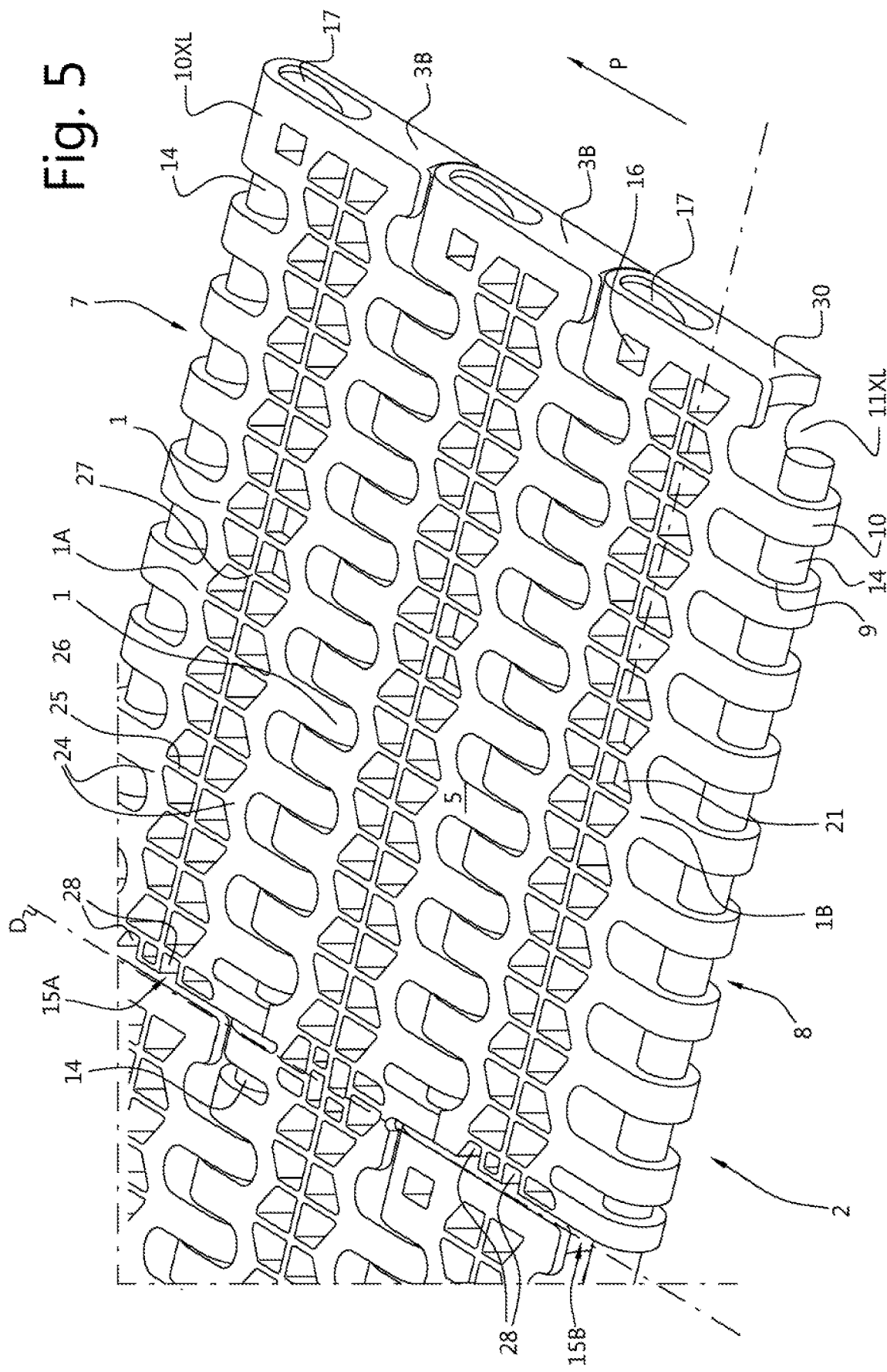

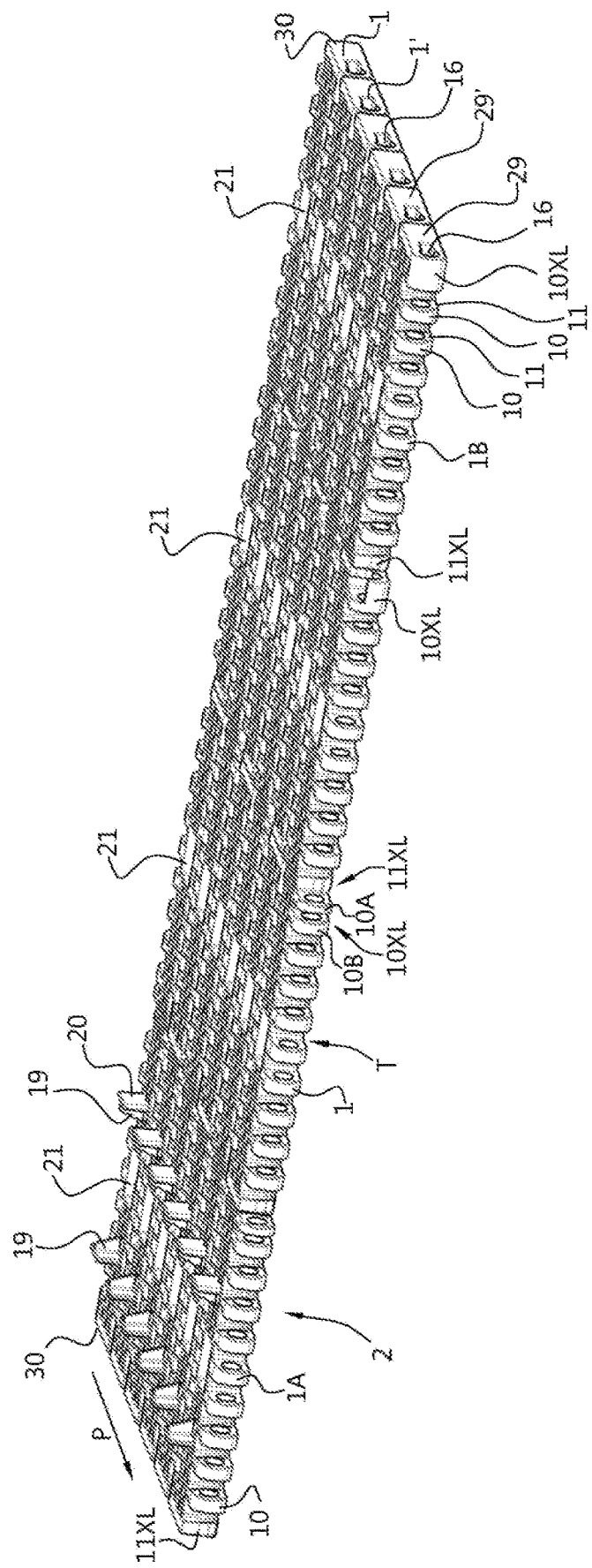

MODULAR CONVEYOR MAT AND MODULE THEREFOR

CROSS-REFERENCE TO RELATED APPLICATIONS

This application is a 371 application of PCT/NL2021/050210 filed on Mar. 31, 2021, which claims priority of Netherlands patent application 2025273 filed on Apr. 3, 2020, both of which are incorporated by reference herein in their entirety.

The invention relates to a module for a modular conveyor mat, and to a conveyor mat built up from modules.

Such modules and mats are generally known and are used for conveying products.

A module known from WO 2012074390 comprises a body part extending transversely to a conveying direction between two sides along a main axis, with a top for carrying products to be conveyed and a bottom for cooperation with a conveyor track. The body part is provided with coupling elements at the front and the rear as viewed in the conveying direction. The coupling elements at both front and rear comprise a series of successive hinge parts and adjacent receiving spaces alternating transversely to the conveying direction, and opposite coupling elements at the front and rear of the body part form a pair of a hinge part and a correspondingly formed receiving space, so that hinge parts and receiving spaces can interdigitate with receiving spaces and hinge parts of similar modules successive in conveying direction. Successive modules can be hingedly coupled with the aid of hinge pins extending transversely to the conveying direction, reaching through hinge bores provided in the hinge parts. In view of the force transmission between the modules, a relatively large number of relatively narrow coupling elements are provided. Thus, the number of points where the hinge pin is shear loaded is chosen to be as large as possible, and bending between these points is as small as possible.

Modules for modular conveyor mats are usually manufactured by means of molding, and are often manufactured from plastic material. Suitable plastic materials are, for example, polyester or acetal. The hinge pin is likewise preferably manufactured from plastic material, for example polypropylene or polyester.

Because they are molded, modules mutually have relatively small deviations regarding size, surface and shape. As a result, the modules can be properly assembled to form a mat. Modules successive in conveying direction can in this manner be joined to form a mat of a desired length. The mat is usually of endless design, so that it can be passed over a conveyor track with the aid of return wheels. The width of the mat may then be varied by placing a plurality of modules next to each other transversely to the conveying direction and coupling them by means of continuous hinge pins.

Rows of modules successive in conveying direction are often staggered with respect to each other transversely to the conveying direction, so that a brick pattern is formed with which continuous cracks in conveying direction between the modules of the mat can be avoided. To form the brick pattern, usually two sizes of modules are provided: long modules having along the main axis a normal length, for example 17 cm or 6" and short modules having along the main axis a shorter length, for example 8.5 cm or 3". In successive rows, long modules can be included in a manner staggered with respect to each other, and spaces having arisen at the longitudinal edge of the mat can then be filled up with a short module.

Modules located at longitudinal edges of the mat are designed as closing module by providing them with a lock provision for locking the hinge pin against migration transversely to the conveying direction. Such a locking provision may for instance be implemented as an integrally formed closing clip, but may also be implemented as a receiving provision for a loose closing clip or as a stop surface for an end face of a pin.

To build a mat, a large number of variants of modules may thus be necessary, for example a left and right long closing module, a left and right short closing module and a long central module without lock provision. In a number of cases, there may be added to these, for instance, a variant where modules located near the longitudinal edge or near the middle of the mat need to be provided further, at their undersides, with a guide element to cooperate with guide strips of the track on which the mat is supported.

Because of the relatively high costs of molds and the logistic complexity of a larger number of different modules, the modules are usually most preferably made only in as few variants as possible. For instance, long closing modules may be sawn to form short closing modules. The body part is then divided into a plurality of parts by dividing the body part along a dividing plane extending parallel to sides of the modules.

In WO2012074390 it has already been proposed to build a mat on the basis of just one type of module. With this module, all coupling elements are implemented with an equal width, and the body part is provided with a dividing plane which extends parallel to the sides, which is implemented as a break provision, and along which the module is divisible by breaking. Due to all coupling elements being made of equal width, the modules can be included in the mat on both a left and a right longitudinal edge, and be formed into a shorter closing module by breaking. However, a disadvantage of this module is that the locking provision, which is integrated into a hinge part bordering on a side of the module, is relatively weak.

The object of the invention is to provide a module for a modular conveyor mat and a conveyor mat built up from such modules, with which, while preserving the advantages mentioned, the disadvantages mentioned can be counteracted.

To that end, the invention provides a module for a modular conveyor mat, comprising a body part extending transversely to a conveying direction between two sides along a main axis, with a top for carrying products to be conveyed and a bottom for cooperation with a conveyor track, wherein the body part, at the front and rear as viewed in the conveying direction, is provided with coupling elements, wherein the coupling elements at both front and rear comprise a series of successive hinge parts and receiving spaces alternating transversely to the conveying direction, and wherein opposite coupling elements at the front and rear of the body part form a pair of a hinge part and a correspondingly formed receiving space, so that hinge parts and receiving spaces can interdigitate with receiving spaces and hinge parts of a similar module successive in conveying direction, and the successive modules are hingedly couplable with the aid of hinge pins extending transversely to the conveying direction, reaching through hinge bores provided in the hinge parts, wherein the body part is provided in the middle with a dividing plane which extends parallel to the sides and along which the module is divisible into two module halves, wherein the pairs of coupling elements located on the sides, viewed in the direction of the main axis, are implemented with a greater width than neighboring coupling elements of the body part, and wherein, further, pairs of coupling elements located on both sides of the dividing plane of the module are also implemented with the same width as the coupling elements with said greater width located on the sides. The merit of providing such a pattern of coupling elements of greater width is that, whilst preserving the advantages of the reduced number of types of modules, yet room can be made for accommodating a sufficiently strong locking provision.

The hinge parts of greater width on the side of the module can in the pattern lie diametrically with respect to each other with respect to both the opposite side of the body part and the side surface located on the same module half that borders on the dividing plane; this applies also to the receiving spaces. Both the modules and the module halves are 180° reversible about an axis transverse to the top, so that the front and rear can be interchanged for coupling with successive modules. Thus, the undivided module as well as both module halves after division can be easily applied in the conveyor mat.

At least a hinge part located on a side of the body part can, due to the widening, properly comprise a locking provision for locking the hinge pin against migration transverse to the conveying direction. The locking provision may be implemented as a blocking element which is adjustable between a release position and a blocking position and which in the release position leaves the bore of the hinge part clear (free), and in the blocking position extends into the bore and hinders passage of a hinge pin through the bore.

The locking provision may be an integrated locking provision, such as a closing clip adjustable between the positions mentioned, or a stop surface for axial cooperation with the end face of the hinge pin. The locking provision may also be implemented as a receiving provision for a detachable closing element, such as a closing clip which in the release position may, for instance, be detached, and in the blocking position may be mounted. A receiving provision has as an advantage that it can be applied on both sides of the module.

By choosing the width of the other coupling elements to be equal to that of the neighboring coupling elements mentioned, it can be achieved that the other coupling elements can be optimized for force transmission. The series of coupling elements between the wide coupling elements on the edge and those adjacent to the dividing plane can then have an equal width among themselves.

When the coupling elements that are implemented with a greater width have double the width of the other coupling elements, it can be achieved that the force transmission remains surprisingly good, while sufficient space is available for a locking provision. Within this context, double width is to be understood as a width in between 1.5 and 2.5 times the width of the neighboring coupling element, in particular between 1.8 and 2.2 times, more particularly 1.9 and 2.1 times and specifically 2 times.

When at least a hinge part located adjacent the dividing plane comprises two hinge part halves separated by a notch, the manufacturability of a wide hinge part can be improved. Especially, material can be saved, the cycle time can be kept short compared with a one-part solid hinge part, and creep and sagging of the surface can be counteracted.

By providing the body part with a guide element at the underside, in particular at the underside of only one of the module halves bordering on the dividing planes, it can be achieved that the module can cooperate with guide strips of the track on which the conveyor mat is supported. The guide element may be implemented, for example, as two mutually spaced-apart downwardly extending guide surfaces extending parallel to the side of the module. The guide element may be implemented as a separate part, which is for instance detachably coupled with the module. The guide element may also be formed integrally with the module, for example by including a detachable insert in the mold of the module.

By providing the body part at the bottom with a drive chamber, it can be achieved that the module can cooperate in a proper force transmission with teeth of a drive gear. The body part may for instance on either side of the dividing plane be provided with at least one drive chamber, so that both module halves have a drive chamber. Elegantly, the drive chamber extends in the longitudinal direction over the main axis along a plurality of coupling provisions, for example over a width of about three unwidened coupling elements.

By providing the body part with through openings extending between the top and bottom, it can be achieved that the module is liquid transmissive in a direction transverse to the top, for example for cleaning the conveyor mat and/or products to be conveyed thereon.

By providing at least a number of the receiving spaces near the body part with a cutout which, when a coupling element is received in the receiving space, forms an additional opening extending between the top and bottom, it can be achieved that an extra part of the conveying surface of the conveyor mat can be made of liquid-transmissive design.

The maximum dimension of the openings and additional openings in a conveying surface formed by tops of successive modules is, measured in the conveying surface, preferably about 2-5 mm, in particular about 3-4 mm. In this way, it can be achieved that the stability on the conveying surface is augmented of products having protrusions at the bottom. Advantageously, at least a percentage of about 20-60%, in particular about 50% of the conveying surface formed with the tops of the modules is open. By keeping the openings and additional openings towards the bottom substantially equal, cleanability can be enhanced. The sidewalls of the openings then run substantially parallel to counteract adherence of dirt.

By providing the body part with two main ribs extending along the main axis, each carrying hinge parts, and which are spaced apart with a mutual intermediate distance with respect to the main axis, a module can be formed that is relatively stiff, and relatively thin-walled and light, and which can be injection molded with a short cycle time. Also, a module with such double main ribs may be provided with a relatively large open surface. The main ribs can extend over at least a part of the main axis of the module in a corrugated fashion. By connecting the main ribs via longitudinal ribs extending in conveying direction, the tensile strength of the module can be augmented, and the stability of products on the top of the body part can be augmented. The longitudinal ribs preferably extend between opposite coupling elements. The body part may further be provided, for further strength and stability enhancement, with a central rib extending over the main axis, which connects the longitudinal ribs. The longitudinal ribs and the central rib preferably have a wall thickness that is less than the main ribs, e.g. a wall thickness that is about half, or less, of the wall thickness of the main ribs. Within this context, half of the thickness should be understood as a thickness that is in between 0.3 and 0.7 times the wall thickness of the main ribs, in particular between 0.4 and 0.6 times, and specifically 0.5 times.

When the longitudinal ribs and central rib at least at the top of the body part form a lattice, between which the openings are formed, a module configuration can be obtained with a top that is relatively open, and yet provides a relatively high product stability. A part of the lattice advantageously forms the top of the drive chamber, so that this chamber is properly cleanable.

By leaving the body part at the location of the dividing plane free of longitudinal ribs, the module can be relatively easily divided into two halves, for example by sawing it through. Advantageously, the body part may then be provided with guide elements extending in conveying direction and bordering on the dividing plane. Such guide elements may guide, for example, a band saw, but may also advantageously contribute to the formation of a relatively smoothly formed side surface of the module half.

By giving the body part, in a direction transverse to the conveying direction, a dimension of about 17 cm, in particular 169.8 mm, or about 6", and the divided module halves a dimension of about 8.5 cm, in particular 84.8 mm, or 3", the module can be well employed in standardized metric or Imperial systems, respectively.

The invention also provides a modular conveyor mat, comprising a plurality of in conveying direction successive rows of modules of the above-mentioned type, which are coupled with the aid of hinge pins extending transversely to the conveying direction, and wherein in conveying direction successive modules are staggered with respect to each other according to a brick pattern, and wherein in at least a number of rows of modules a module is included whose body part is divided along the dividing plane, and wherein more particularly at least a number of in conveying direction successive rows consist alternately of undivided modules and of a combination of undivided modules and at least a module whose body part is divided along the dividing plane.

It is then preferred that two halves of a module divided along the dividing plane are each included with a side thereof on a longitudinal edge of the conveyor mat. The divided module halves of a module may then be located with their sides on the same longitudinal edge of the conveyor mat, or on opposite longitudinal edges. The module halves may have been rotated 180° with respect to each other about an axis transverse to the top of their body parts. Advantageously, with both halves of the divided module, the hinge part located on the side of the body part and bordering on the longitudinal edge of the conveyor mat comprises a locking provision for locking the hinge pin against migration transverse to the conveying direction.

As regards the disclosure made here, it is noted that the above-mentioned technical features, whether or not included in a dependent claim, may also each in itself be used to advantage, and if desired can also be used in random combinations in a module for a modular conveyor mat. This also concerns combination of the discussed features separately or in random combination with a module for a modular conveyor mat in which not all features of the embodiment described herein are used, for example a module including a body part extending transversely to a conveying direction along a main axis between two sides, with a top for carrying products to be conveyed and a bottom for cooperation with a conveyor track, and with coupling elements at both a front and a rear as viewed in conveying direction, and wherein coupling elements at both the front and the rear comprise a series of hinge parts and receiving spaces, so that hinge parts and receiving spaces can interdigitate with receiving spaces and hinge parts of in conveying direction successive similar modules, and successive modules are hingedly coupled with the aid of hinge pins extending transversely to the conveying direction.

The invention will be further elucidated on the basis of a non-limitative exemplary embodiment which is represented in a drawing. In the drawing.

Figure 4:
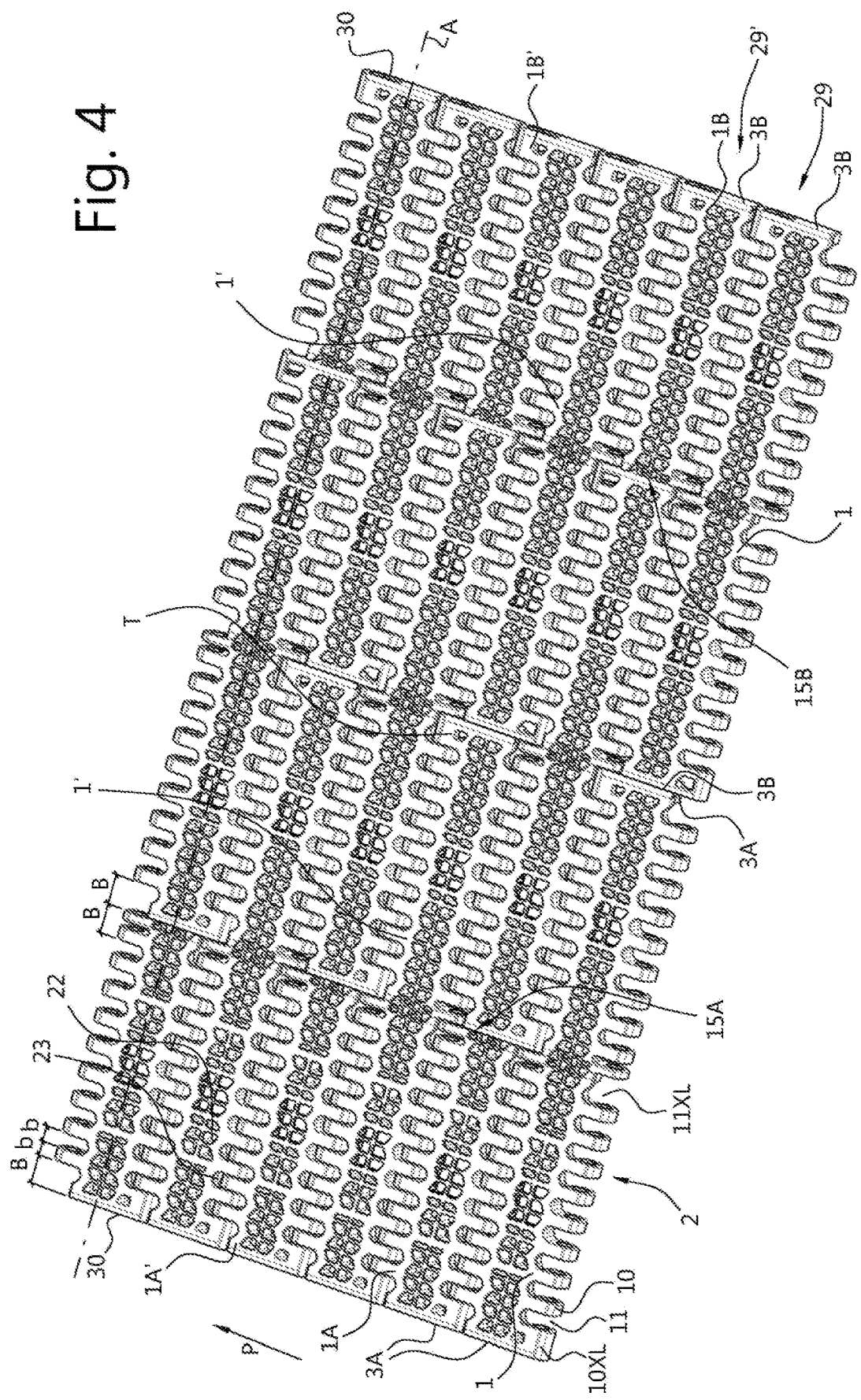
FIG. 4 shows a perspective top view of a modular conveyor mat assembled on the basis of modules of FIG. 1.

FIG. 5 shows a detail of a longitudinal edge of the conveyor mat of FIG. 4 in which hinge pins are represented and in which the hinge parts of greater width on the longitudinal edge are provided with a locking provision for locking the hinge pin, formed by a receiving provision with a detachable closing clip received therein; and FIG. 6 shows a schematic perspective bottom view of the conveyor mat of FIG. 4.

It is noted that the figures are merely schematic representations of a preferred embodiment of the invention. In the figures, identical or corresponding parts are represented with the same reference numerals.

Figure 1:
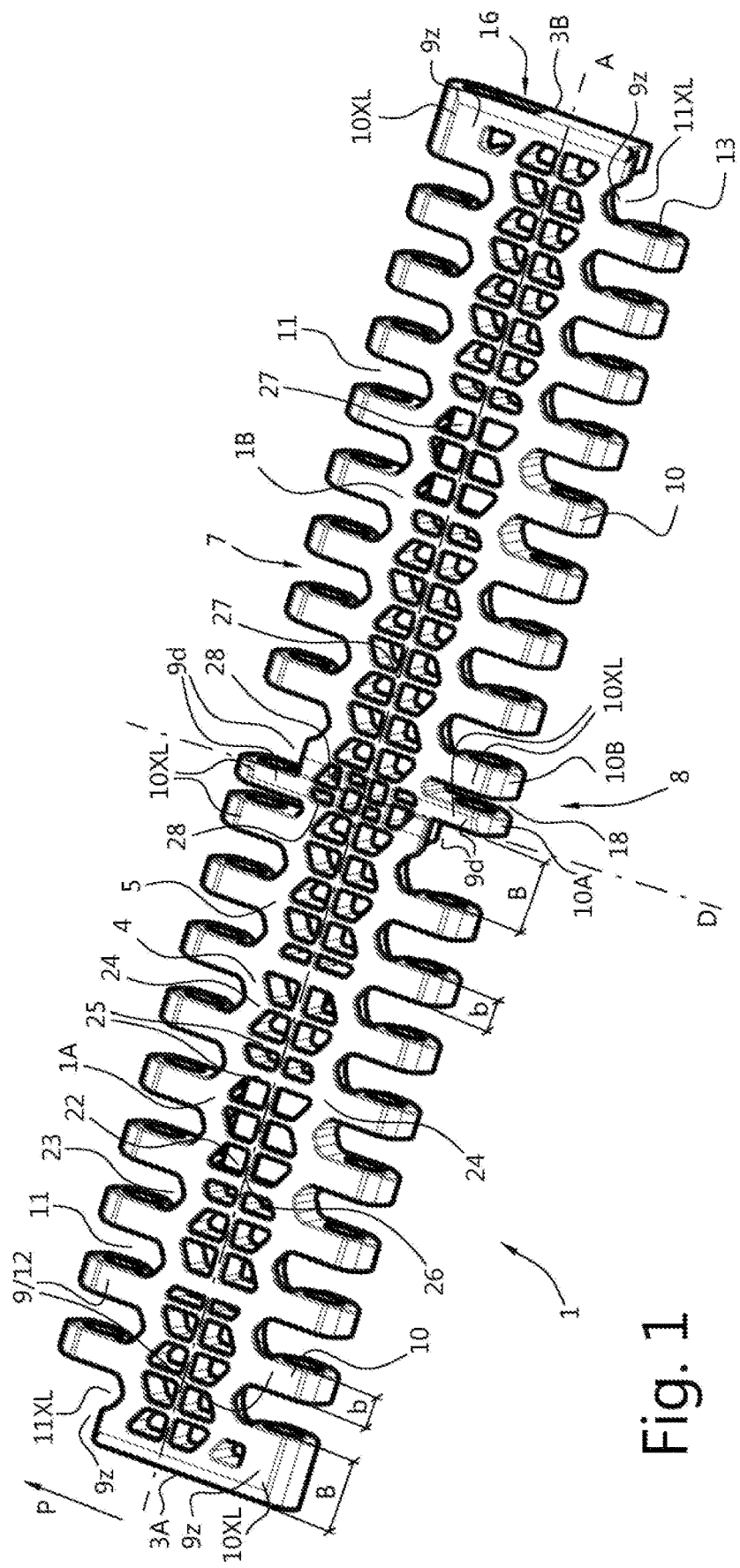
FIG. 1 shows a schematic perspective top view of a module for a modular conveyor mat.
Figure 2:
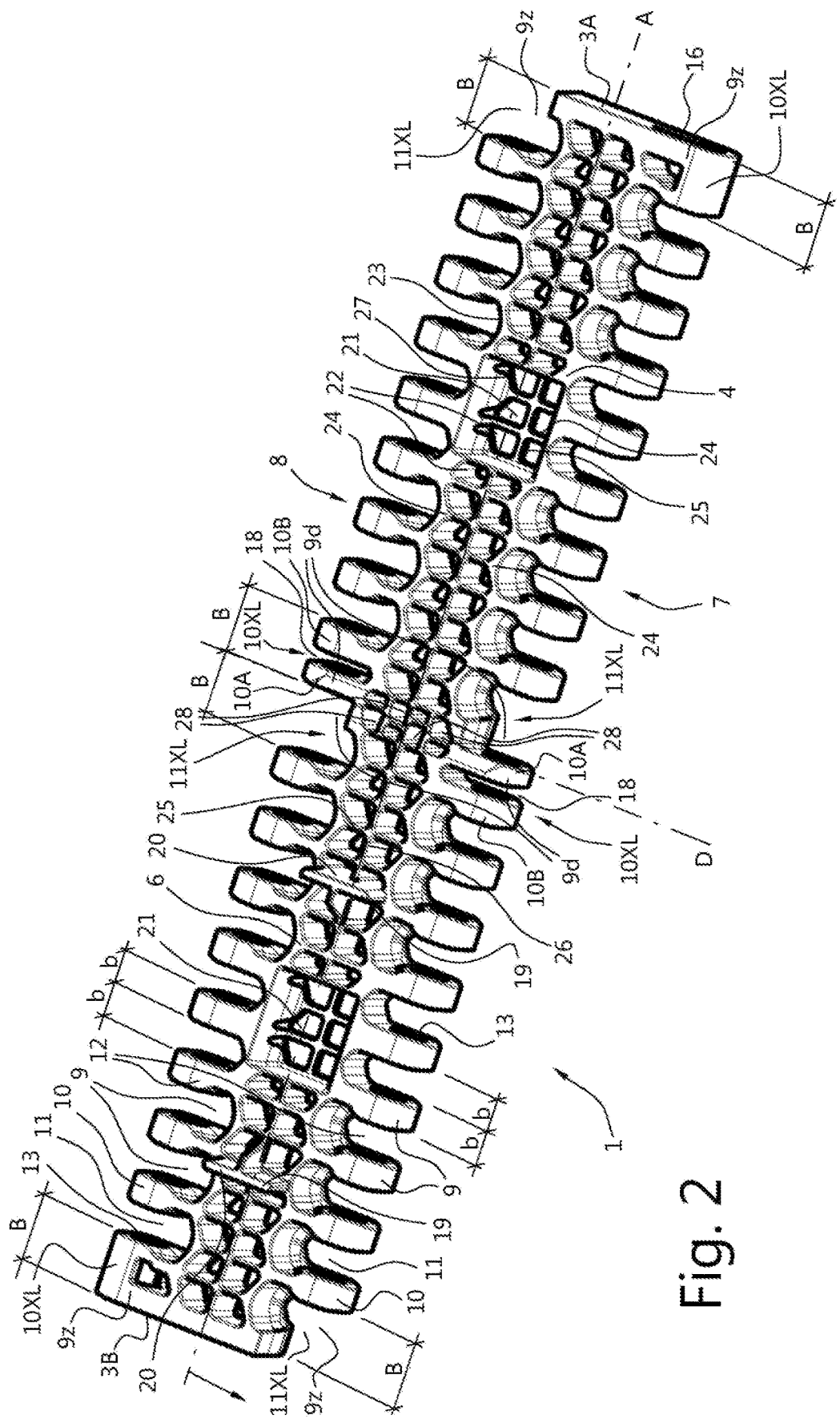
FIG. 2 shows a schematic perspective bottom view of the module of FIG. 1.
Figure 3:
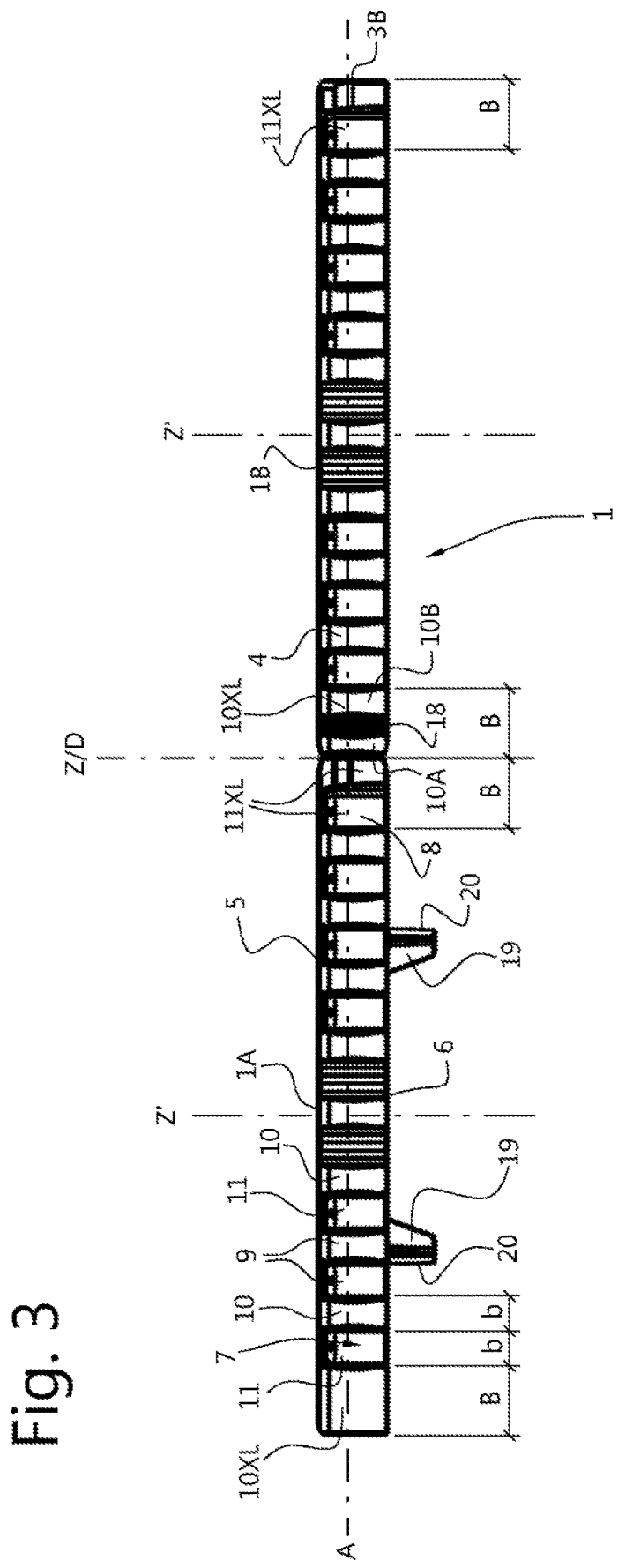
FIG. 3 shows a schematic front view of the module of FIG. 1.

FIGS. 1-3 show a module 1 for a modular conveyor mat 2 which is represented in FIGS. 4 and 5. Referring to FIGS. 1-5, the module 1 comprises a body part 4 extending transversely to a conveying direction P between two sides 3A, 3B along a main axis A. The body part has a top 5 for carrying products to be conveyed and a bottom 6 for cooperation with a conveyor track, not represented. The body part 4 is provided with coupling elements 9 at the front 7 and rear 8 as viewed in the conveying direction P. The coupling elements 9 at both the front 7 and the rear 8 comprise a series of successive hinge parts 10 and receiving spaces 11 alternating transversely to the conveying direction. Opposite coupling elements 9 at the front 7 and the rear 8 of the body part 4 form a pair 12 of a hinge part 10 and a correspondingly formed receiving space 11. Hinge parts 10 and receiving spaces 11 can interdigitate with receiving spaces 11' and hinge parts 10' of a similar module 1' successive in conveying direction. Successive modules 1, 1' can be hingedly coupled with the aid of hinge pins 14 extending transversely to the conveying direction and reaching through hinge bores 13 provided in the hinge parts 10. Successive modules can thus pivot relative to each other about an axis parallel to the conveying surface T formed by the tops of successive modules and transverse to conveying direction P, so that the conveyor mat for instance can circulate in an endless loop around a set of gears.

The body part 4 is provided in the middle with a dividing plane D extending parallel to the sides, and along which the module is divisible into two module halves 1A, 1B. In the front view of FIG. 3 it can be properly seen that the top 5 on both sides of the dividing plane D slopes down obliquely in order to counteract sharp edges after division coming to lie in the conveying surface.

The pairs of coupling elements $9z$ located on the sides 3A, 3B are implemented, as viewed in the direction of the main axis A, with a greater width B than the width b of neighboring coupling elements 9 of the body part 4. Further, pairs of coupling elements $9d$ located on either side of the dividing plane D of the module 1 are also implemented with the same width as the coupling elements $9z$ located on the sides with the greater width B mentioned. The width b of the other coupling elements 9 is chosen to be mutually equal to that of the neighboring coupling elements; the series of coupling elements 9 between the wide coupling elements $9z$ on the sides 3A, 3D and the wide coupling elements 9*d* which border on the dividing plane have an equal and hence narrower width b.

The coupling elements 9*z*, 9*d* implemented with greater width have, in this example, double the width of the other coupling elements 9, specifically a twice as large a width along the main axis A.

The hinge parts 10XL of greater width on the side 3A of the module lie diametrically with respect to both the hinge parts 10B on the opposite side 3B of the body part 4 and the side surface 15A, located on the same module half 1A, and bordering on the dividing plane D. This also applies to the receiving spaces 11XL. Both the modules 1 themselves and the module halves 1A, 1B resulting after division are 180° reversible about an axis Z transverse to the top of the body part, so that the front 7 and rear 8 can be interchanged for coupling with a next module 1'.

Both hinge parts located on a side of the body part comprise a locking provision 16 for locking the hinge pin against migration transverse to the conveying direction P. The locking provision is implemented as a blocking element adjustable between a release position and a blocking position and which in the release position leaves the hinge bore of the hinge part clear, and in the blocking position extends into the hinge bore and hinders passage of a hinge pin 14 through the hinge bore.

The locking provision 16 in this example is implemented as a receiving provision for a detachable closing element, in particular a closing clip 17. This receiving provision has as an advantage that it can be applied on both sides of the module, and that, when on a side no closing element is arranged, it does not hinder passage. The hinge parts 10XL bordering on the dividing plane D each comprise two hinge part halves 10A and 10B separated by a notch 18. The body part 4 is further provided, at the bottom 6 of only one of the module halves 1A bordering on the dividing plane D, with a guide element 19 for cooperation with guide strips of the track on which the conveyor mat is supported. The guide element 19 in this exemplary embodiment is integrally formed with the body part 4 and is implemented with two spaced-apart downwardly extending guide surfaces 20 which extend parallel to the side 3A of the module. Only the module half 1A has a guide element.

The body part 4 is further provided, at the bottom on both sides of the dividing plane D, with a drive chamber 21 for cooperation with teeth of a driving gear, so that both module halves 1A, 1B have a drive chamber 21. The drive chamber extends in the longitudinal direction along main axis A, along three unwidened coupling elements 9.

The body part 4 is further provided with through openings 22 extending between the top 5 and bottom 6, for cleaning the conveyor mat and/or products to be conveyed thereon.

The receiving spaces 11 are provided, near the body part 4, with cutout 22 which, when, as can be seen in FIG. 4, a coupling element 10 is received in the receiving space 11, forms an additional opening 23 extending between the top and bottom to make an extra portion of the conveying surface T of the conveyor mat 2 liquid-transmissive. In FIG. 3 it can be properly seen that the openings and additional openings towards the bottom remain the same or increase in size, for the sake of cleanability.

The body part 4 is further provided with two main ribs 24A, 24B extending in a corrugated fashion along the main axis A, each carrying hinge parts 10, and which are spaced apart with a mutual intermediate distance with respect to the main axis A. The pointed, parallel main ribs 24A, 24B are connected via longitudinal ribs 25 extending in conveying direction P between opposite coupling elements 10, 11. The body part 4 is further provided with a central rib 26 extending over the main axis, and connecting the longitudinal ribs. The longitudinal ribs 25 and the central rib 26 in this example have a wall thickness of 0.5 times the wall thickness of the main ribs. The longitudinal ribs 25 and the central rib 26 form, at least at the top 5 of the body part, a lattice 27 between which the openings 22 are formed. In FIG. 5 it can be properly seen that the lattice 27 also forms the top of the drive chamber 21, so that the latter is open at the top and hence is properly cleanable.

The body part 4, at the location of the dividing plane D, has been left free of longitudinal ribs 26, so that the module can be relatively simply sawn into two halves. The body part 4 is provided with guide elements 28 extending in the conveying direction P, bordering on the dividing plane D, and which can guide a band saw upon dividing of a module into module halves 1A, 1B, and which after division form relatively smoothly formed side surfaces 15A, 15B of the respective module halves 1A, 1B.

The body part 4 has, in a direction transverse to the conveying direction P, a dimension of 17 cm, in particular a nominal specification dimension of 69.8 mm and the divided module halves each have a dimension of 8.5 cm, in particular a nominal specification dimension of 84.8 mm.

FIGS. 4, 5 and 6 show a modular conveyor mat 2, comprising a number of in conveying direction successive, alternating rows 29 and 29' of modules 1 which are coupled with the aid of hinge pins extending transversely to the conveying direction P across the width of the conveyor mat 2. In conveying direction P, successive modules are staggered with respect to each other according to a brick pattern. In the rows 29', at longitudinal edges 30 of the conveyor mat 2, a module 1 has been included whose body part has been divided along the dividing plane into two module halves 1A, 1B which have been rotated 180° relative to each other about an axis Z transverse to the top 5 of their body parts 4. With both module halves 1A, 1B of the divided module 1, the hinge part 10*xl* which borders on the longitudinal edge 30 of the conveyor mat 2 is provided with a locking provision 16 for locking the hinge pin against migration transverse to the conveying direction. The intermediate rows 29 comprise two undivided modules 1 which have, or have not, been turned 180° relative to each other about an axis Z transverse to the top 5 of their body parts 4. In FIG. 5 it is shown that the hinge parts 10*xl* of greater width at the longitudinal edge 30 of the conveyor mat 2 are provided with a locking provision 16 which is formed by a receiving provision having a detachable closing clip 17 received therein.

The wide hinge parts 10*xl* are received in corresponding wide receiving spaces 11*xl*. With successive modules 1, 1', which in the brick pattern are staggered with respect to each other transversely to the conveying direction, the additional wider coupling elements 9*d* bordering on the dividing plane D accommodate the wider coupling elements 9*z* located on the sides. With both modules 1, the hinge part 10*xl* located on the side 3A or 3B of the body part 4 and bordering on the longitudinal edge 30 of the conveyor mat 2 is provided with a locking provision 16 for locking the hinge pin 14 against migration transverse to the conveying direction P.

The maximum dimension of the opening and additional openings in a conveying surface T formed by the tops 5 of successive modules 1, 1' is in this example about 3 mm and the conveying surface T is about 55% open.

As shown in FIG. 6, the conveyor mat 2 is made up of two kinds of long modules 1, namely long modules with guide elements and long modules without guide elements 19. If desired, the conveyor mat may be assembled from one kind of long modules, for example when no guide elements 19 are needed, or when the guide elements are detachably connected with the modules.

The invention is not limited to the exemplary embodiment represented here. In particular, at the location of the dividing plane a break provision may be arranged. In addition, the top of the body part may be of closed design, i.e. substantially without openings. Also, the coupling elements, in particular the hinge parts may be designed differently.

Such variants will be clear to the skilled person and are understood to fall within the scope of the invention as set forth in the following claims.

REFERENCE NUMERALS

1 Module
1A, 1B Module half
2 Conveyor mat
3A, 3B Side
4 Body part
5 Top
6 Bottom
7 Front
8 Rear
9 Coupling elements
9z Coupling element at side
9d Coupling element at dividing plane
10 Hinge part
10xl Wider hinge part
10A, 10B Hinge part half
11 Receiving space
11xl Wider receiving space
12 Pair of coupling elements
13 Bore
14 Hinge pin
15A, 15B Side surface
16 Locking provision
17 Closing clip
18 Notch
19 Guide element
20 Guide surface
21 Drive chamber
22 Opening
Additional opening/Cutout
24 Main rib
25 Longitudinal rib
26 Central rib
27 Lattice
28 Guide surface
29 Row
30 Longitudinal edge
A Main axis
b Width normal coupling element
B Width wider coupling element
D Dividing plane
T Conveying surface
Z Rotation axis

The invention claimed is:

1. A module for a modular conveyor mat, comprising a body part extending transversely to a conveying direction between two sides along a main axis, with a top for carrying products to be conveyed and a bottom for cooperation with a conveyor track, wherein the body part, at the front and rear as viewed in the conveying direction, is provided with coupling elements, wherein the coupling elements at both front and rear comprise a series of successive hinge parts and receiving spaces alternating transversely to the conveying direction, and wherein opposite coupling elements at the front and rear of the body part form a pair of a hinge part and a correspondingly formed receiving space, so that hinge parts and receiving spaces can interdigitate with receiving spaces and hinge parts of a similar module successive in conveying direction, and the successive modules are hingedly couplable with the aid of hinge pins extending transversely to the conveying direction, reaching through hinge bores provided in the hinge parts, wherein the body part is provided in the middle with a dividing plane which extends parallel to the sides and along which the module is divisible into two module halves, wherein the pairs of coupling elements located on the sides, viewed in the direction of the main axis, are implemented with a greater width than neighboring coupling elements of the body part, and wherein, further, pairs of coupling elements located on both sides of the dividing plane of the module are also implemented with the same width as the coupling elements with said greater width located on the sides.

2. The module according to claim 1, wherein at least a hinge part located on a side of the body part comprises a locking provision for locking the hinge pin against migration transverse to the conveying direction.

3. The module according to claim 1, wherein the width of the other coupling elements is equal to that of said neighboring coupling elements.

4. The module according to claim 1, wherein the coupling elements that are implemented with said greater width have double the width of the other coupling elements.

5. The module according to claim 1, wherein at least a hinge part adjacent the dividing plane comprises two hinge part halves separated by a notch.

6. The module according to claim 1, wherein the body part is provided with a guide element at the bottom, in particular at the bottom of only one of the module halves bordering on the dividing planes.

7. The module according to claim 1, wherein the body part is provided at the bottom with a drive chamber.

8. The module according to claim 1, wherein the body part is provided with through openings extending between the top and bottom.

9. The module according to claim 1, wherein at least a number of the receiving spaces near the body part is provided with a cutout which, when a coupling element is received in the receiving space, forms an additional opening extending between the top and bottom.

10. The module according to claim 1, wherein the body part is provided with two main ribs extending along the main axis, which each carry hinge parts, and which are spaced apart with a mutual intermediate distance with respect to the main axis.

11. The module according to claim 10, wherein the main ribs are connected via longitudinal ribs extending in conveying direction.

12. The module according to claim 10, wherein the body part is provided with a central rib extending over the main axis.

13. The module according to claim 1, wherein:
the body part is provided with through openings extending between the top and bottom;
the body part is provided with two main ribs extending along the main axis, which each carry hinge parts, and which are spaced apart with a mutual intermediate distance with respect to the main axis;
the main ribs are connected via longitudinal ribs extending in conveying direction;

the body part is provided with a central rib extending over the main axis; and the longitudinal ribs and central rib at least at the top of the body part form a lattice, between which the openings are formed.

14. The module according to claim 10, wherein the body part at the location of the dividing plane is free of longitudinal ribs.

15. The module according to claim 14, wherein the body part is provided with guide elements extending in the conveying direction, bordering on the dividing plane.

16. The module according to claim 1, wherein the body part in a direction transverse to the conveying direction has a dimension of about 17 cm or about 6 inch.

* * * * *